(12) United States Patent
Fideler (10) Patent No.: US 10,940,498 B2
(45) Date of Patent: Mar. 9, 2021

(54) AIRLESS SPRAY GUN WITH IMPROVED TRIGGER ASSEMBLY

(71) Applicant: Wagner Spray Tech Corporation, Plymouth, MN (US)

(72) Inventor: Brian L. Fideler, Jordan, MN (US)

(73) Assignee: Wager Spray Tech Corporation, Plymouth, MN (US)

(*) Notice: Subject to any disclaimer, the term of this patent is extended or adjusted under 35 U.S.C. 154(b) by 0 days.

(21) Appl. No.: 15/704,670

(22) Filed: Sep. 14, 2017

(65) Prior Publication Data

US 2019/0076865 A1    Mar. 14, 2019

(51) Int. Cl.
*B05B 12/00* (2018.01)
*B05B 15/63* (2018.01)
(Continued)

(52) U.S. Cl.
CPC ............. *B05B 12/002* (2013.01); *B05B 9/01* (2013.01); *B05B 15/62* (2018.02); *B05B 15/63* (2018.02);
(Continued)

(58) Field of Classification Search
CPC ......... B05B 12/022; B05B 15/62; B05B 9/01; B05B 15/091; B05B 1/3431;
(Continued)

(56) References Cited

U.S. PATENT DOCUMENTS

| | | | |
|---|---|---|---|
| 1,631,167 A * | 6/1927 | Tereau | B05B 1/308 239/456 |
| 1,698,945 A | 1/1929 | Vincent | |
| 1,849,300 A * | 3/1932 | Jenkins | B05B 7/0815 239/301 |
| 1,876,644 A * | 9/1932 | Downs | B05B 7/06 239/71 |
| 2,497,625 A * | 2/1950 | Norwick | B05B 7/12 239/417 |
| 2,567,176 A * | 9/1951 | Ballard | B05B 1/1681 239/449 |

(Continued)

FOREIGN PATENT DOCUMENTS

| | | |
|---|---|---|
| CN | 2230188 Y | 7/1996 |
| CN | 1902002 A | 1/2007 |

(Continued)

OTHER PUBLICATIONS

First Office Action from Chinese Application No. 201080052349.X, dated May 16, 2014. With English Translation. 17 Pages.

(Continued)

*Primary Examiner* — Joseph A Greenlund
(74) *Attorney, Agent, or Firm* — Christopher R. Christenson; Kelly, Holt & Christenson PLLC (57) ABSTRACT

A spray gun is presented. The spray gun includes a fluid applicator configured to receive a pressurized liquid through an inlet and disperse the pressurize liquid through an outlet. The fluid applicator includes a body defining a fluid path. The fluid applicator includes a valve assembly with a first end portion opposite of a second end portion configured to be movable between a first position and a second position. The second end portion is configured to be in fluidic contact with the pressurized liquid at the first position. Both the first end portion and the second end portion are configured to be in fluidic contact with the pressurized liquid at the second position. The first end portion includes a portion of a blocking member configured to contact a seat within the body. The second end portion includes a distal portion of a guide. The fluid applicator also includes an actuating mechanism configured to couple to the valve assembly and selectively move the valve assembly within the body between the first position and the second position.

19 Claims, 7 Drawing Sheets

(51) Int. Cl.
   *B05B 15/62* (2018.01)
   *B05B 9/01* (2006.01)
   *F16K 31/524* (2006.01)
   *F16K 31/60* (2006.01)
   *B05B 1/34* (2006.01)
   *B05B 12/12* (2006.01)

(52) U.S. Cl.
   CPC ...... *F16K 31/52425* (2013.01); *B05B 1/3431* (2013.01); *B05B 12/12* (2013.01); *F16K 31/602* (2013.01)

(58) Field of Classification Search
   CPC ............ B05B 11/3056; B05B 11/3057; B05B 11/0075; F16K 31/52475; F16K 31/524; F16K 31/602; F16K 15/026; F16K 39/045
   USPC ................................................ 239/526, 583
   See application file for complete search history.

(56) References Cited

U.S. PATENT DOCUMENTS

| | | | | |
|---|---|---|---|---|
| 2,969,926 | A * | 1/1961 | Peeps | B05B 1/3046 239/526 |
| 3,016,929 | A * | 1/1962 | Rapaport | F16K 21/16 141/263 |
| 3,236,459 | A | 2/1966 | Mccritchie | |
| 3,282,511 | A * | 11/1966 | Barton | A62C 31/005 239/459 |
| 3,396,937 | A * | 8/1968 | McDougall | B05B 1/308 251/107 |
| 3,865,314 | A * | 2/1975 | Levey | B05B 1/042 239/590.3 |
| 3,888,421 | A * | 6/1975 | Chow | B05B 9/01 239/456 |
| 4,166,579 | A * | 9/1979 | Beise | B05B 9/01 239/526 |
| 4,219,162 | A * | 8/1980 | Dadson | B05B 1/308 239/526 |
| 4,448,355 | A * | 5/1984 | Roman | B05B 1/308 239/526 |
| 4,448,391 | A * | 5/1984 | Young | F16K 21/04 251/251 |
| 4,534,512 | A * | 8/1985 | Chow | B05B 1/12 239/394 |
| 4,560,109 | A * | 12/1985 | Teruyuki | F16J 15/3236 239/526 |
| 4,776,517 | A * | 10/1988 | Heren | B05B 12/0024 239/391 |
| 4,784,330 | A * | 11/1988 | Hammelmann | B05B 1/30 239/526 |
| 4,802,313 | A * | 2/1989 | Smith | B24C 5/02 239/526 |
| 4,817,872 | A | 4/1989 | Mattson | |
| 4,834,293 | A * | 5/1989 | Lichfield | B05B 1/304 239/447 |
| 4,933,569 | A * | 6/1990 | Merchlewitz | B05B 1/304 251/282 |
| 4,958,769 | A | 9/1990 | Schowiak | |
| D313,270 | S | 12/1990 | Lin | |
| D314,421 | S | 2/1991 | Tajima et al. | |
| 5,064,119 | A | 11/1991 | Mellette | |
| 5,090,623 | A | 2/1992 | Burns et al. | |
| 5,119,992 | A | 6/1992 | Grime | |
| 5,141,161 | A | 8/1992 | Anderson et al. | |
| 5,218,993 | A | 6/1993 | Steinberg et al. | |
| 5,284,301 | A * | 2/1994 | Kieffer | B05B 12/0022 239/528 |
| 5,332,159 | A | 7/1994 | Grime et al. | |
| 5,370,314 | A * | 12/1994 | Gebauer | B05B 12/0026 239/526 |
| 5,392,992 | A | 2/1995 | Farnsteiner et al. | |
| 5,609,302 | A | 3/1997 | Smith | |
| 5,662,273 | A * | 9/1997 | Chih | B05B 15/00 239/526 |
| 5,732,886 | A | 3/1998 | Liaw | |
| 5,740,968 | A * | 4/1998 | Mueller | B05B 1/3046 239/526 |
| 5,836,517 | A | 11/1998 | Burns et al. | |
| 5,873,530 | A * | 2/1999 | Chizinsky | B05B 7/2416 239/318 |
| 6,019,294 | A | 2/2000 | Anderson et al. | |
| 6,032,922 | A * | 3/2000 | Shew | F16K 31/52433 239/526 |
| 6,173,910 | B1 * | 1/2001 | Yean | B05B 1/3013 239/525 |
| 6,176,437 | B1 * | 1/2001 | Pedersen | B05B 1/005 137/624.14 |
| 6,260,774 | B1 * | 7/2001 | Erickson | B05B 1/3013 239/526 |
| 6,279,839 | B1 * | 8/2001 | Chang | B05B 1/3046 239/391 |
| 6,450,422 | B1 | 9/2002 | Maggio | |
| 6,460,787 | B1 | 10/2002 | Hartle et al. | |
| 6,561,441 | B1 * | 5/2003 | Hsieh | B05B 1/1654 239/525 |
| 6,641,061 | B1 * | 11/2003 | Hsieh | B05B 1/1609 239/526 |
| 6,708,900 | B1 | 3/2004 | Zhu et al. | |
| 6,860,438 | B1 | 3/2005 | Huang | |
| 6,880,803 | B2 * | 4/2005 | Kassulat | B05B 1/302 251/237 |
| D552,715 | S | 10/2007 | Schmon et al. | |
| 7,296,780 | B1 * | 11/2007 | Hung | B05B 1/3026 239/526 |
| D563,505 | S | 3/2008 | Schmon et al. | |
| 7,360,720 | B2 * | 4/2008 | Gohring et al. | B05B 7/2416 118/300 |
| D570,448 | S | 6/2008 | Wang | |
| 7,389,945 | B2 * | 6/2008 | Huang | B05B 7/1209 239/290 |
| D574,928 | S | 8/2008 | Huang | |
| D581,483 | S | 11/2008 | Bass et al. | |
| 7,527,239 | B2 * | 5/2009 | Mau | F16K 1/12 239/526 |
| D604,393 | S | 11/2009 | Johnson et al. | |
| D604,394 | S | 11/2009 | Wang | |
| 7,694,893 | B2 * | 4/2010 | Zittel | B29B 7/803 239/117 |
| D616,527 | S | 5/2010 | Anderson et al. | |
| 7,789,327 | B2 * | 9/2010 | Micheli | B05B 7/1209 239/526 |
| 7,866,573 | B2 * | 1/2011 | Stenborg | B05B 12/002 239/526 |
| 7,922,107 | B2 | 4/2011 | Fox | |
| 7,959,191 | B2 | 6/2011 | Schouten | |
| 7,971,806 | B2 * | 7/2011 | Johnson | B05B 7/2416 239/296 |
| 8,308,083 | B2 * | 11/2012 | Woodgate | B05B 7/066 239/297 |
| 8,312,896 | B2 * | 11/2012 | Baltz | B05B 7/12 137/630.15 |
| 8,490,896 | B2 * | 7/2013 | Chen | B05B 1/06 239/526 |
| 8,684,281 | B2 * | 4/2014 | Micheli | B05B 7/0815 239/1 |
| 8,690,083 | B2 * | 4/2014 | Drozd | B05B 7/12 239/583 |
| 8,870,097 | B2 * | 10/2014 | Micheli | B05B 9/01 239/526 |
| 8,950,693 | B2 * | 2/2015 | Hsieh | B05B 9/01 239/526 |
| 9,010,658 | B2 * | 4/2015 | Johnson | B05B 15/65 239/117 |
| 9,192,950 | B2 * | 11/2015 | Carleton | B05B 7/2478 |
| 9,802,211 | B2 * | 10/2017 | Joseph | B05B 7/0861 |
| 2002/0038826 | A1 * | 4/2002 | Hurray | B05B 12/0026 239/600 |
| 2003/0006322 | A1 | 1/2003 | Hartle et al. | |

(56) References Cited

U.S. PATENT DOCUMENTS

| | | |
|---|---|---|
| 2003/0071144 A1 | 4/2003 | Naemura |
| 2004/0089742 A1 | 5/2004 | Antonucci |
| 2005/0098691 A1 | 5/2005 | Yorns et al. |
| 2005/0145723 A1* | 7/2005 | Blette .................. B05B 7/0815 239/525 |
| 2006/0065760 A1* | 3/2006 | Micheli ................ B05B 3/1014 239/237 |
| 2007/0057092 A1 | 3/2007 | Huang |
| 2007/0080243 A1 | 4/2007 | Alexander |
| 2007/0205305 A1 | 9/2007 | Vagedes |
| 2008/0017734 A1* | 1/2008 | Micheli .................. B05B 1/042 239/296 |
| 2008/0296409 A1* | 12/2008 | Micheli .................. B05B 13/00 239/526 |
| 2009/0008481 A1 | 1/2009 | Smith et al. |
| 2009/0050716 A1* | 2/2009 | Binder .................. B05B 15/60 239/526 |
| 2009/0302133 A1 | 12/2009 | Micheli et al. |
| 2010/0008804 A1 | 1/2010 | Liska |
| 2011/0072956 A1* | 3/2011 | Wall ........................ F42D 1/14 89/1.11 |
| 2012/0325934 A1* | 12/2012 | DeLorme ................ B05B 1/341 239/526 |
| 2014/0054399 A1 | 2/2014 | Hsieh |
| 2015/0014445 A1* | 1/2015 | Kinoshita ............... B22C 9/101 239/526 |
| 2016/0375453 A1* | 12/2016 | Tullney .................. B05B 15/14 239/1 |
| 2019/0076857 A1* | 3/2019 | Fideler .................. B05B 1/3046 |
| 2019/0076865 A1* | 3/2019 | Fideler ...................... B05B 9/01 |

FOREIGN PATENT DOCUMENTS

| | | |
|---|---|---|
| CN | 101125316 A | 2/2008 |
| CN | 101300081 A | 11/2008 |
| CN | 201543532 U | 8/2010 |
| CN | 201815423 U | 5/2011 |
| CN | 203227581 U | 10/2013 |
| DE | 102006019364 A1 | 10/2007 |
| EP | 1679125 A1 | 7/2006 |
| JP | 3185312 U | 8/2013 |
| KR | 20-0192546 Y1 | 8/2000 |
| KR | 10-1229696 B1 | 2/2013 |
| KR | 1020140119824 A | 10/2014 |
| WO | 2007122094 A1 | 11/2007 |
| WO | 2009029926 A1 | 3/2009 |
| WO | WO 2009/137425 A2 | 11/2009 |
| WO | WO 2009/140472 A1 | 11/2009 |
| WO | 2010/080365 A1 | 7/2010 |

OTHER PUBLICATIONS

Second Office Action from Chinese Application No. 201080052349.X, dated Oct. 30, 2014, 14 pages.
PCT/US2010/055051 Communication Relating to the Results of the Partial International Search dated Feb. 14, 2011. 2 pages.
Wagner Wideshot Power Painter, Owner's Manual, 20 pp, dated Oct. 2006.
Graco press release New HVLP TurboForce, dated Jan. 3, 2009, accessed at http://public.graco.be/0/?d=588.
Binks Model 18N Spray Gun, dated Apr. 1989, accessed at http://www.binks.com/Service%20Bulletins/77-1795r-12.pdf on Sep. 4, 2009.
Wagner The Painting People Control Spray Owners Manual, pp. 1 and 4-6 (4 pages total), © 2005 Wagner Spray Tech, Commercially Available 2005.
Views of the Commercially Available product cited in Row 1 of Non-Patent Literature Documents (previously referenced. see above), 1 page, 2005.
PCT/US2010/055051 International Search Report and Written Opinion dated May 9, 2011, 15 pages.
Graco, Fine Finish Solutions, dated Dec. 2008, accessed at http://www.graco.com/Distributors/DLibrary.nsf/Files/300564/$file/300564G.pdf on Nov. 19, 2009, 13 pages.
International Search Report and Written Opinion for U.S. Appl. No. PCT/US2018/044603, dated Nov. 27, 2018, date of filing: Jul. 31, 2018, 20 pages.
International Search Report and Written Opinion for International Patent Application No. PCT/US2018/044600, dated Nov. 16, 2018, filing date: Jul. 31, 2018, 17 pages.
Prosecution History for U.S. Appl. No. 15/704,745 including: Amendment dated Sep. 14, 2018, Non-Final Office Action dated May 16, 2018, and Application and Drawings filed Sep. 14, 2017, 47 pages.
Final Office Action for U.S. Appl. No. 15/704,745 dated Jan. 24, 2019, 13 pages.
International Preliminary Report on Patentability for International Patent Application No. PCT/US2018/044603, dated Mar. 26, 2020, 14 pages.
International Preliminary Report on Patentability for International Patent Application No. PCT/US2018/044600, dated Mar. 26, 2020, 13 pages.
First Office Action for Chinese Patent Application No. 201880056898.0 dated Nov. 27, 2020, 20 pages with English Translation.

* cited by examiner

AIRLESS SPRAY GUN WITH IMPROVED TRIGGER ASSEMBLY

BACKGROUND

Many spray guns include a liquid applicator with a trigger. Triggers on liquid applicators are often pressure actuated, for example, a user's hand or fingers can apply force to a trigger and, as a result of the applied force, paint, or another exemplary liquid, flows from an outlet of the liquid applicator. However, when a user releases pressure on the trigger, the outgoing flow ceases. For at least some liquid applicators, the applied pressure corresponds to a pressure of a liquid exiting the liquid applicator.

SUMMARY

A spray gun is presented. The spray gun includes a fluid applicator configured to receive a pressurized liquid through an inlet and disperse the pressurize liquid through an outlet. The fluid applicator includes a body defining a fluid path. The fluid applicator includes a valve assembly with a first end portion opposite of a second end portion configured to be movable between a first position and a second position. The second end portion is configured to be in fluidic contact with the pressurized liquid at the first position. Both the first end portion and the second end portion are configured to be in fluidic contact with the pressurized liquid at the second position. The first end portion includes a portion of a blocking member configured to contact a seat within the body. The second end portion includes a distal portion of a guide. The fluid applicator also includes an actuating mechanism configured to couple to the valve assembly and selectively move the valve assembly within the body between the first position and the second position.

DETAILED DESCRIPTION OF ILLUSTRATIVE EMBODIMENTS

In operation, spray guns require an application of pressure to actuate a trigger, which, in turn, drives a valve assembly towards an open, or second, position allowing for a dispersal of liquid. Alternatively, when a spray gun is not in use, a trigger is configured to maintain a non-actuated position effectively keeping a valve assembly in a closed, first, position to reduce a risk of accidental fluid discharge. However, during operation, this design causes user fatigue over a duration of a paint spraying operation as a user has to consistently apply pressure to the trigger to keep the valve assembly in the open position. Current attempts to offset the pressure exerting a force holding the valve open have included using a spring force to counter balance said pressure that will move the valve to a closed position when the trigger is released. However, a spray gun is desired that effectively reduces the pressure (holding the valve open) without necessitating a spring (to counter act the pressure force holding the valve open) proximate to the valve assembly. Some embodiments provided herein include a spray gun design that effectively reduces or eliminates the fluid pressure holding the valve assembly in the open position.

Aspects of the present disclosure relate to spray guns, for example spray guns configured to dispense paint, coatings, textured material, plural components, etc. While the present disclosure is not necessarily limited to such applications, various aspects of the disclosure may be appreciated through a discussion of various examples, for example paint, in order to provide context.

Figure 1:
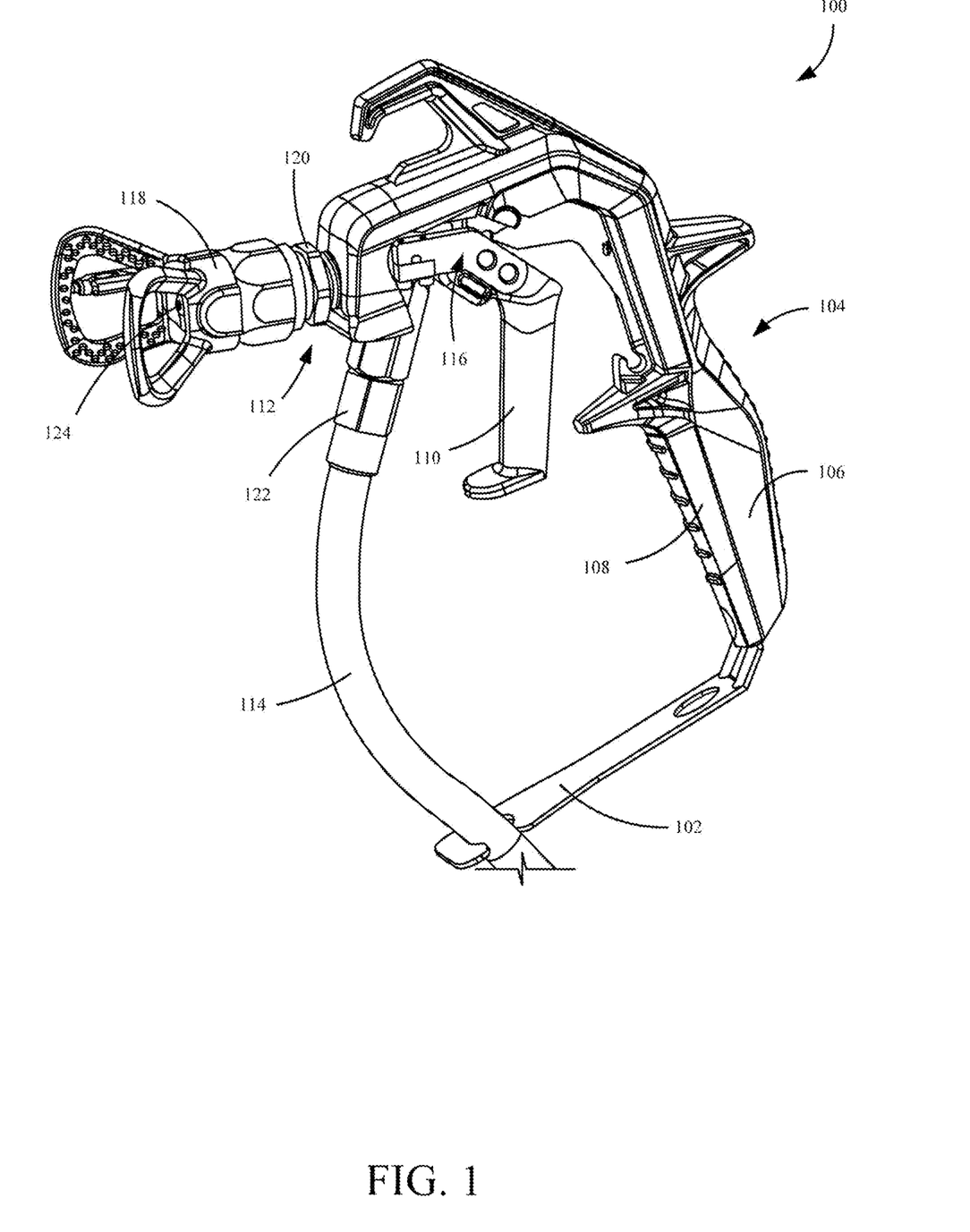
FIG. 1 is a diagrammatic view of a spray gun in accordance with an embodiment of the present invention.

FIG. 1 is a diagrammatic view of a spray gun in accordance with an embodiment of the present invention. As illustratively shown, spray gun 100 includes a fluid applicator 112, a hose 114, a front end portion 118, a clip 102 and a handle 104. Fluid applicator 112 is configured to receive a pressurized liquid through hose 114 and disperse the pressurized liquid through an outlet 124. Hose 114 is attached to fluid applicator 112 using threaded member 122. However, in other embodiments, hose 114 is coupled to fluid applicator 112 using other connection mechanisms. Front end portion 118 is configured to orient a dispersal of fluid in a particular direction as pressurized fluid is dispersed from outlet 124. During operation, handle 104 is configured to be held by a user during a liquid spraying operation, and, in one embodiment, includes a top housing 106 and a bottom housing 108 configured to couple together. Further handle 104 is coupled to hose 114 using clip 102.

Fluid applicator 112 includes a trigger 110 coupled to a body of fluid applicator 112 using a coupling mechanism 116 and a diffuser 120 configured to reduce a velocity and increase a static pressure of pressurized liquid as it is dispersed from outlet 124. In operation, trigger 110 is configured to drive or otherwise actuate a valve assembly, within a body of fluid applicator 112, between a first and second position. In one embodiment, when spray gun 100 is not in use, trigger 110 is biased towards a non-actuated position so that a valve assembly within a body of fluid applicator 112 remains in a first position preventing a dispersal of liquid from outlet 124. Upon applying a pressure to trigger 110, trigger 110 moves to an actuated position and simultaneously drives the valve assembly to a second position allowing for a dispersal of liquid from outlet 124. In one example, while the valve assembly is in the first position, pressurized liquid remains within hose 114 and the body of fluid applicator 112 and is not dispersed as the valve assembly obstructs the pressurized fluid from outlet 124. By subsequently moving the valve assembly to the second position, the valve assembly does not obstruct outlet 124 and the pressurized fluid within the body and hose 114 is able to be dispersed.

Figure 2:
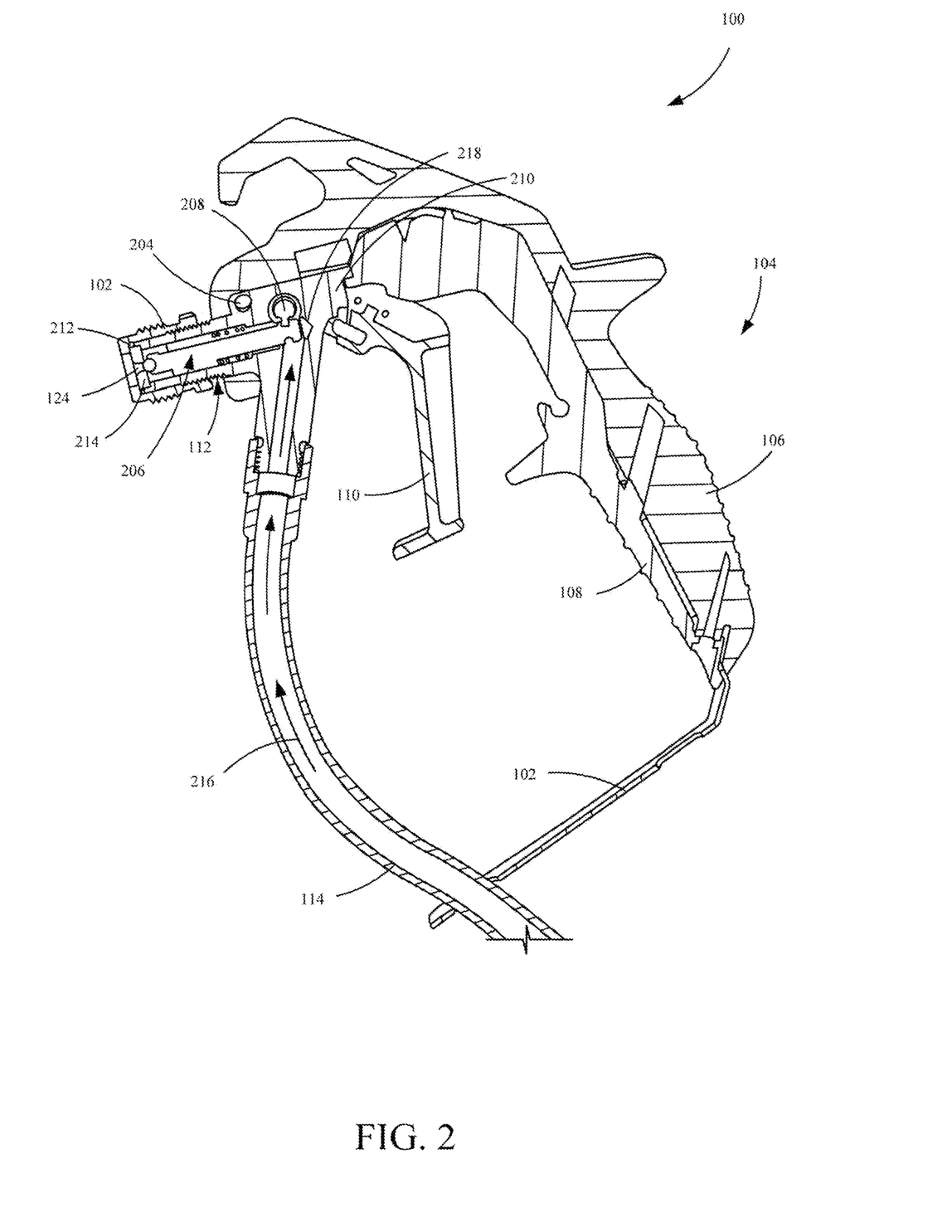
FIG. 2 is a cross-sectional view of a spray gun in accordance with an embodiment of the present invention.

FIG. 2 is a cross-sectional view of a spray gun in accordance with an embodiment of the present invention. As illustratively shown, spray gun 100 includes fluid applicator 112, hose 114, clip 102 and handle 104. Handle 104, in one embodiment, includes a top housing 106 and a bottom housing 108 and attaches to fluid applicator 112 at a coupling point 204. Further, handle 104 may also connect to hose 114 using clip 102. Handle 104 is configured to be held during a paint spraying operation. Fluid applicator 112 is configured to receive pressurized fluid from hose 114 along fluid path 216 and disperse pressurized fluid from outlet 124.

Fluid applicator 112 includes a gasket 212, a seat 214, a valve assembly 206 and an actuating mechanism 208 within a diffuser 102-body 210 coupling of fluid applicator 112. Gasket 212, seat 214 and valve assembly 206 are configured to prevent pressurized fluid from being dispersed from outlet 124 while valve assembly 206 is at a first position, as illustratively shown. In this embodiment, valve assembly 206 is in contact with a central aperture of seat 214, while seat 214 and gasket 212 simultaneously contact diffuser 102 and body 210 of fluid applicator 112. In operation, valve assembly 206 is configured to selectively move between the first position and a second position within body 210 of fluid applicator 112. Alternatively, while the first position of valve assembly 206 blocks a dispersal of pressurized fluid from outlet 124, the second position of valve assembly 206 allows for a dispersal of pressurized liquid as valve assembly 206 does not contact seat 214.

Valve assembly 206 is coupled to an actuating mechanism 208 within body 210 of fluid applicator 112. Actuating mechanism 208 is configured to selectively move valve assembly 206 between the first and second positions based on an operator applying pressure to a trigger 110, effectively moving trigger 110 from a non-actuated position, as illustratively shown, to an actuated position. In this example, trigger 110 is coupled to actuating mechanism 208 using a coupling mechanism, e.g. coupling mechanism 116 of FIG. 1.

In operation, upon applying a pressure to trigger 110, a force is subsequently generated and transferred through a coupling mechanism, e.g. coupling mechanism 116 of FIG. 1, to actuating mechanism 208. Upon receiving the force, actuating mechanism 208 moves valve assembly 206 from a first position to a second position in order for a pressurized fluid to be dispersed out of outlet 124. However, in order to maintain a dispersal of pressurized liquid, valve assembly 206 must remain in the second position. As a result, this requires a constant pressure from a user to maintain trigger 110 in an actuated position. However, over a course of a liquid application process, this may cause user fatigue in maintaining an applied pressure to trigger 110. Specifically, as a pressurized fluid travels along flow path 216 and is dispersed out of outlet 124, the pressurized fluid acts against a second end portion, or rear seal portion and, as such, requires an elevated amount of pressure from a user to counterbalance the spring force required to close the valve upon trigger release.

However, in accordance with an embodiment of the present invention, a configuration of flow path 216 allows for an alleviation of pressure required in maintaining valve assembly 206 in a second position, and thus, trigger 110 in an actuated position. For example, by receiving a pressurized liquid through hose 114 located at a distal portion of fluid applicator 112, the pressurized liquid is configured to travel through a rear portion of body 210 and a notch 218, and, subsequently, a second end portion of valve assembly 206 as will be discussed in FIG. 4. By having a pressurized fluid come into contact with a second end portion of valve assembly 206, the pressurized fluid can counter a pressure placed on a first end portion, or obstruction portion, as the pressurized fluid is dispersed through outlet 124. In one example, an equal pressure is then placed on all sides of valve assembly 206 within the pressure vessel, which eliminates a pressure force acting to maintain valve assembly 206 in the second position. By effectively reducing or eliminating the pressure holding the valve assembly in the second, open, position, there is no need for a strong spring in accordance with the present invention, which, in turn, eliminates user fatigue in carrying out a liquid spraying application.

Figure 3:
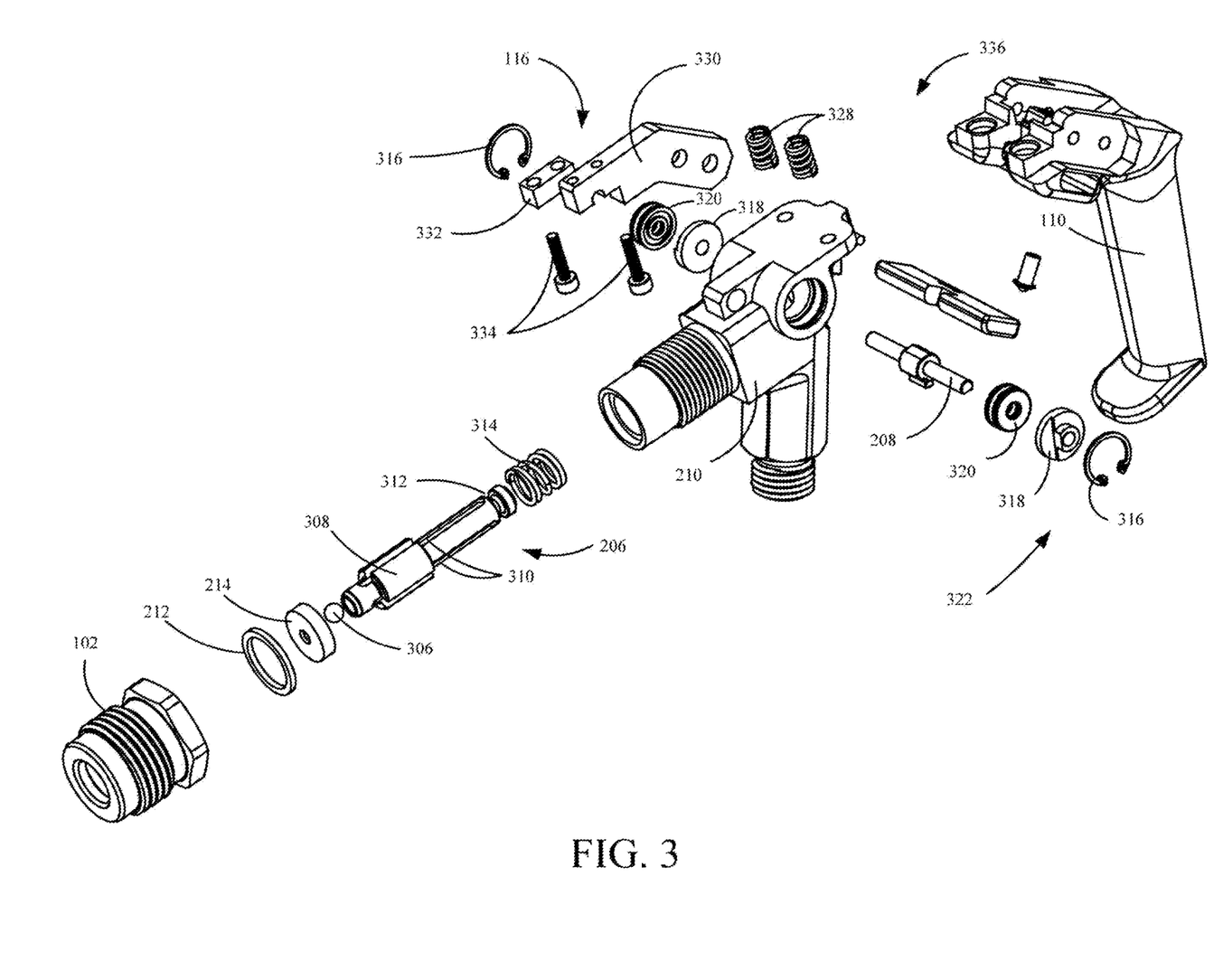
FIG. 3 is an exploded view of a fluid applicator in accordance with an embodiment of the present invention.

FIG. 3 is an exploded view of a fluid applicator in accordance with an embodiment of the present invention. Fluid applicator 336 is similar to fluid applicator 112 and, as such, includes components numbered similarly. As illustratively shown, fluid applicator 336 includes diffuser 102, gasket 212, seat 214 and valve assembly 206.

Gasket 212 and seat 214 are configured to be housed within a diffuser 102-body 210 coupling, and, along with valve assembly 206 at a first position, obstruct pressurized fluid from being dispersed from an outlet. As illustratively shown, valve assembly 206 includes a blocking member 306, a guide 308 and a biasing member 314. Blocking member 306 is configured to couple to guide 308 and, while in a first position, sit against a central aperture of seat 214 serving as an obstruction for pressurized liquid. While in a second position, blocking member 306 and guide 308 are configured to move laterally so that block member 306 moves away from the central aperture of seat 214, allowing pressurized liquid to be dispersed through an outlet of fluid applicator 336. Biasing member 314 is coupled to guide 308 and is configured to be compressed between guide 308 and body 210 while blocking member 306 and guide 308 remain in the second position. In this embodiment, a biasing force is generated and acts on valve assembly 206 in the direction generally towards an outlet of fluid applicator 336. In one embodiment, biasing member 314 is configured to remove any friction within the system.

Guide 308 includes grooves 310 configured to receive a flow of pressurized liquid as the pressurized liquid is dispersed from fluid applicator 336. While two elongated grooves are illustratively shown, guide 308 can include any number of grooves 310. Further, guide 308 includes a radial groove 312 configured to couple to actuating mechanism 208. However, in other embodiments, guide 308 is able to couple to actuating mechanism 208 in a variety of ways.

As illustratively shown, fluid applicator 336 also includes actuating mechanism 208 and sealing mechanisms 322. Actuating mechanism 208 includes a protrusion configured to couple to radial groove 312 of valve assembly 206 and arms configured to couple to sealing mechanisms 322. While it is illustratively shown actuating mechanism includes two arms, it is expressly contemplated that actuating mechanism 208 may only include a singular arm and a protrusion in other embodiments. In this configuration, actuating mechanism 208 would only protrude from one side of fluid applicator 336. Sealing mechanisms 322 include seals 320, bushings 318 and retainers 316 and are configured to prevent a leakage of pressurized liquid from body 210 of fluid applicator 336. Actuating mechanism 208 is a cam configured to receive a rotational force provided from trigger 110 and transform the rotational force into liner motion to selectively drive valve assembly 206 from a first position to a second position. Further, actuating mechanism 208 is configured to be housed within a bore of body 210. In one embodiment, sealing mechanisms 322 are configured to couple to opposing sides of actuating mechanism 208 and are configured to provide a robust seal between body 210 and coupling mechanism 116. However, while it is illustratively shown that sealing mechanisms 322 include seals 320, bushings 318 and retainers 316, it is expressly contemplated that other sealing components can be used to ensure that pressurized liquid does not leak out of body 210 during operation.

Fluid applicator 336 includes a coupling mechanism 116 that includes an arm 330, a bottom 332 and fastening members 334. Coupling mechanism 116 is configured to couple trigger 110 to actuating mechanism 208. In operation, trigger 110 is coupled to arm 330 of coupling mechanism 116 using fastening members 334. Additionally, an arm of actuating mechanism 208 is configured to couple to an arm 330-bottom 332 coupling of coupling mechanism 208 using fastening members 334. Additionally, as illustratively shown, fluid applicator 336 includes biasing members 328 configured to bias trigger 110 in a non-actuated position. Biasing members 328 couple to coupling mechanism 116 and body 210.

While it is illustratively shown that coupling mechanism 116 includes arm 330 and bottom 332 as separate pieces, it is expressly contemplated that arm 330 and bottom 332 can also be a singular piece in some embodiments. Additionally, while it is illustratively shown that actuating mechanism 208 is separate from, and configured to couple to valve assembly 206, in other embodiments, actuating mechanism 208 and valve assembly 206 may be a singular piece configured move between a first position and a second position within body 210.

Figure 4:
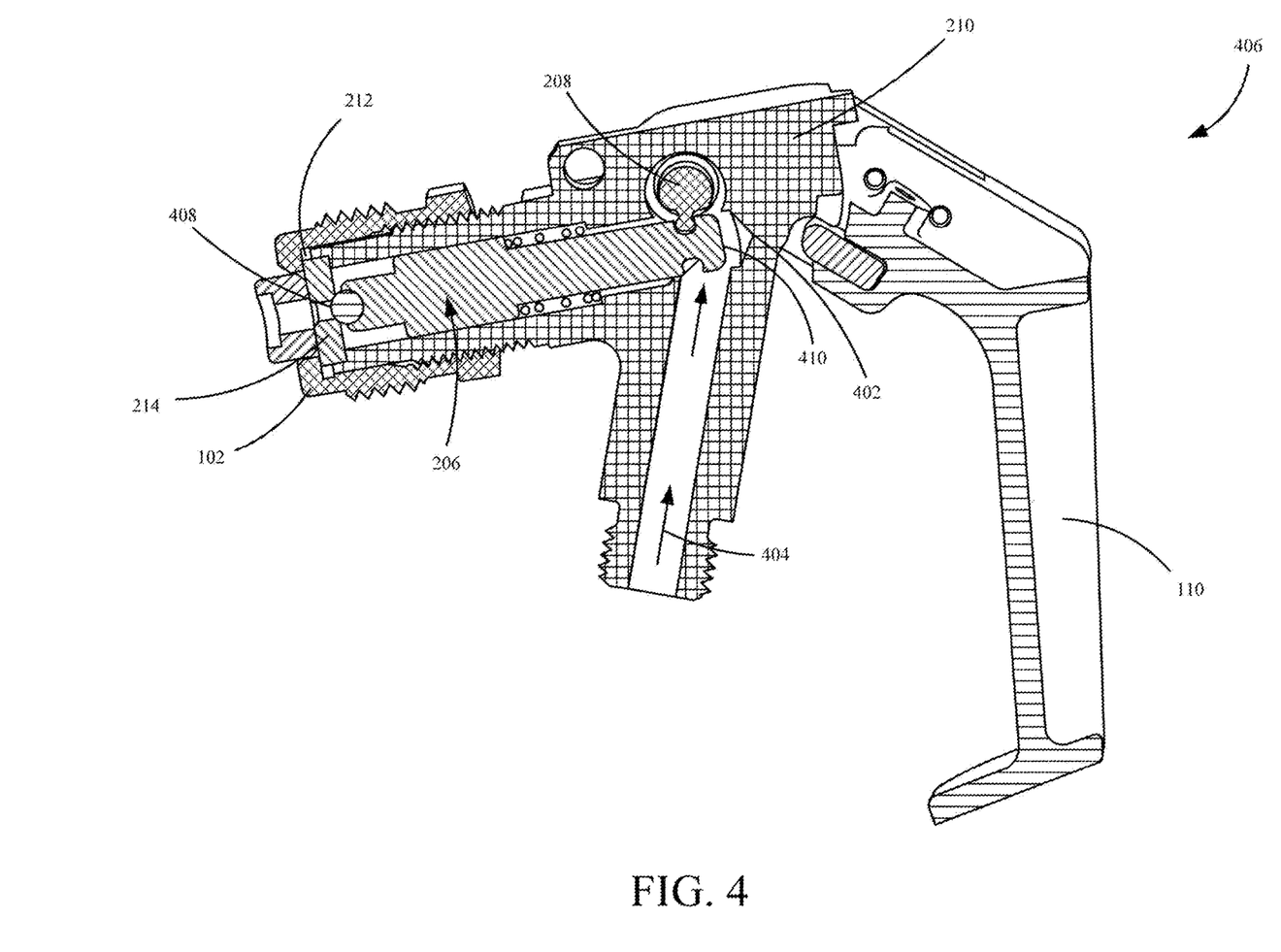
FIG. 4 is a cross-sectional view of a fluid applicator in accordance with an embodiment of the present invention.

FIG. 4 is a cross-sectional view of a fluid applicator in accordance with an embodiment of the present invention. Fluid applicator 406 is similar to fluid applicator 336, and, as such, includes components numbered similarly. Fluid applicator 406 includes a seat 214 and a gasket 212 within a diffuser 102-body 210 coupling configured to serve as an obstruction for pressurized liquid while valve assembly 206 remains in a first position as illustratively shown. However, while valve assembly 206 is in the first position, a second end portion 410 of valve assembly 206 is configured to come into fluidic contact with the pressurized fluid as the pressurized fluid travels along a flow path 404. Further, the pressurized fluid may contact grooves of valve assembly 206. Additionally, the pressurized fluid may also come into contact with a notch 402 within body 210. Notch 402 may include a groove or any other cavity configured to receive the pressurized fluid.

Once valve assembly 206 is moved to a second position through the movement of trigger 110 to an actuated position, a first end portion 408 of valve assembly is configured to come into fluidic contact with the pressurized fluid as the pressurized fluid is dispersed from fluid applicator 406. In one embodiment, an equal pressure is then placed on all sides of valve assembly 206 within a pressure vessel, eliminating a pressure force acting to maintain valve assembly 206 at the second position within the pressure vessel. This eliminates a need for a strong spring which, in turn, removes or eliminates the pressure required in maintaining a trigger at an actuated position.

Figure 5:
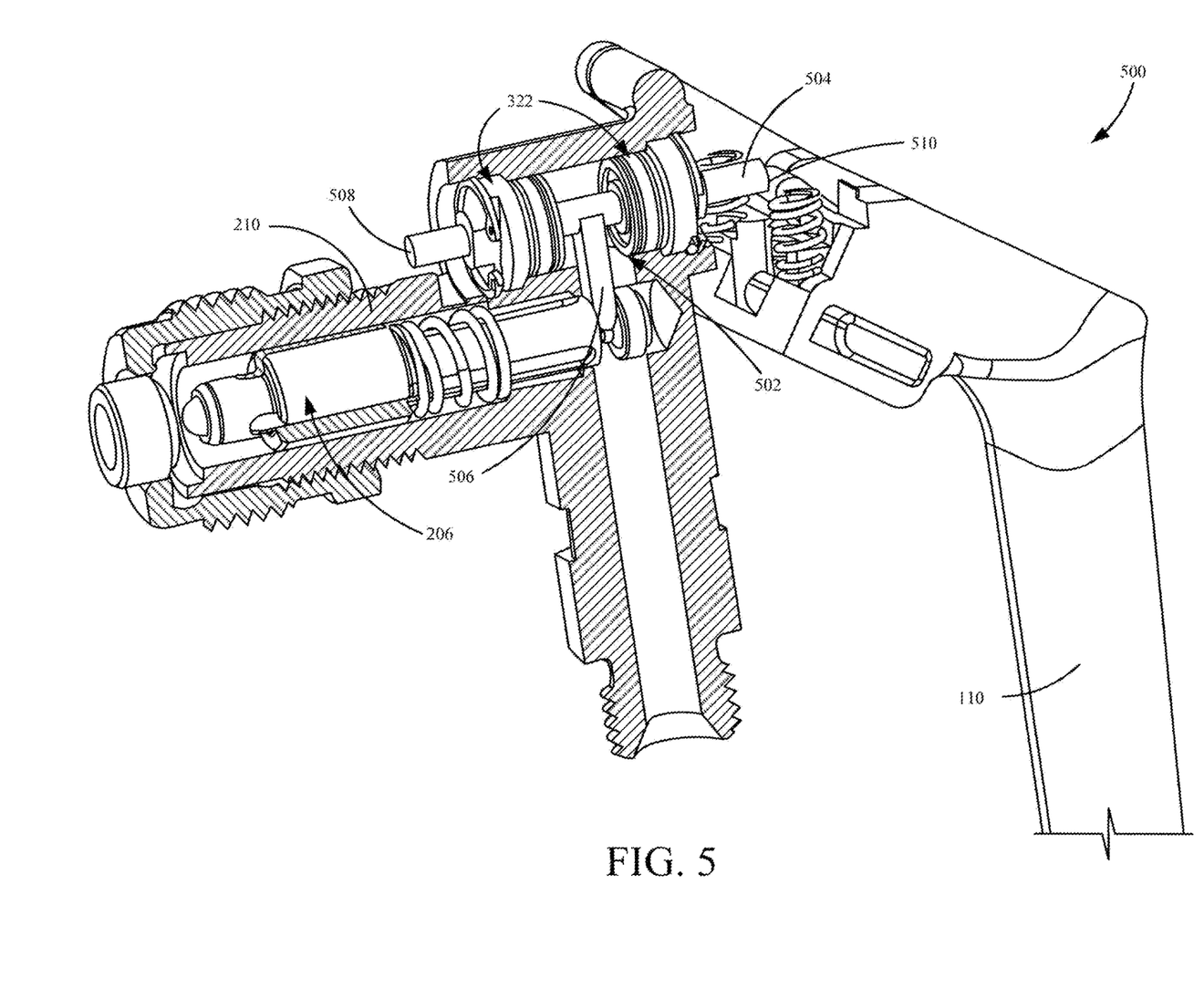
FIG. 5 is a cross-sectional view of a fluid applicator in accordance with an embodiment of the present invention.

FIG. 5 is a cross-sectional view of a fluid applicator in accordance with an embodiment of the present invention. Fluid applicator 500 is similar to fluid applicator 406, and, as such, includes components numbered similarly. As illustratively shown, fluid applicator 500 includes valve assembly 206, trigger 110, sealing mechanisms 322 and an actuating mechanism 502. In one embodiment, actuating mechanism 502 includes a radially extending portion 506 and a longitudinal portion 504 configured to move valve assembly between the first and second positions based on a pressure applied to trigger 110. In this embodiment, longitudinal portion 504 is configured to couple to sealing mechanisms 322 within body 210 and radially extending portion 506 is configured to couple to valve assembly 206. Additionally, while it is illustratively shown that longitudinal portion 504 extends out of body 210 on both sides of fluid applicator 500, it is expressly contemplated that longitudinal portion 504 may only extend through one side of fluid applicator 500 in other embodiments.

Additionally, longitudinal portion 504, as illustratively shown, includes a first end 508 and a second end 510. In one example, first end 508 and second end 510 have identical surface areas and are opposite of one another allowing for a cancellation of pressures when valve assembly 206 is in an open position. In this example, a similar pressure is placed on first end 508 and second end 510 and cancel out in accordance with the present invention. However, while first end 508 and second end 510 have identical surface areas, it is also expressly contemplated that either first end 508 or second end 510 have differing surface areas so that a pressure force is generated.

Figure 6:
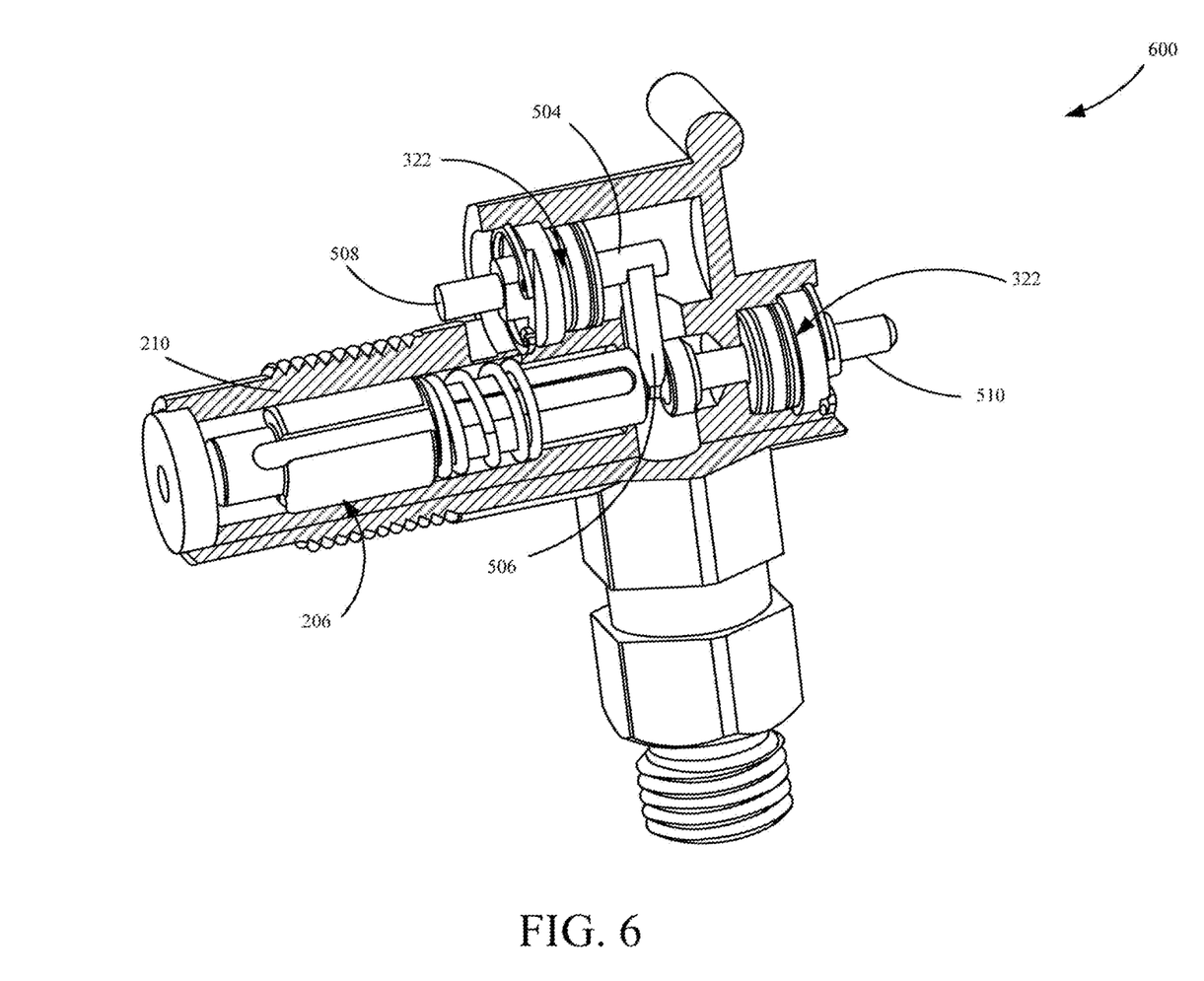
FIG. 6 is a cross-sectional view of a fluid applicator in accordance with an embodiment of the present invention.

FIG. 6 is a cross-sectional view of a fluid applicator in accordance with an embodiment of the present invention. Fluid applicator 600 is similar to fluid applicator 500, and, as such, includes components numbered similarly. Fluid applicator 600 includes longitudinal portion 504 with first end 508. However, as illustratively shown, second end 510 of longitudinal portion 504 is coupled to valve assembly 206. In this example, body 210 of fluid applicator 600 is configured to allow for one of sealing mechanisms 322 and second end 510 to couple to valve assembly 206. This allows for second end 510 to cross a boundary of the pressure vessel.

Figure 7:
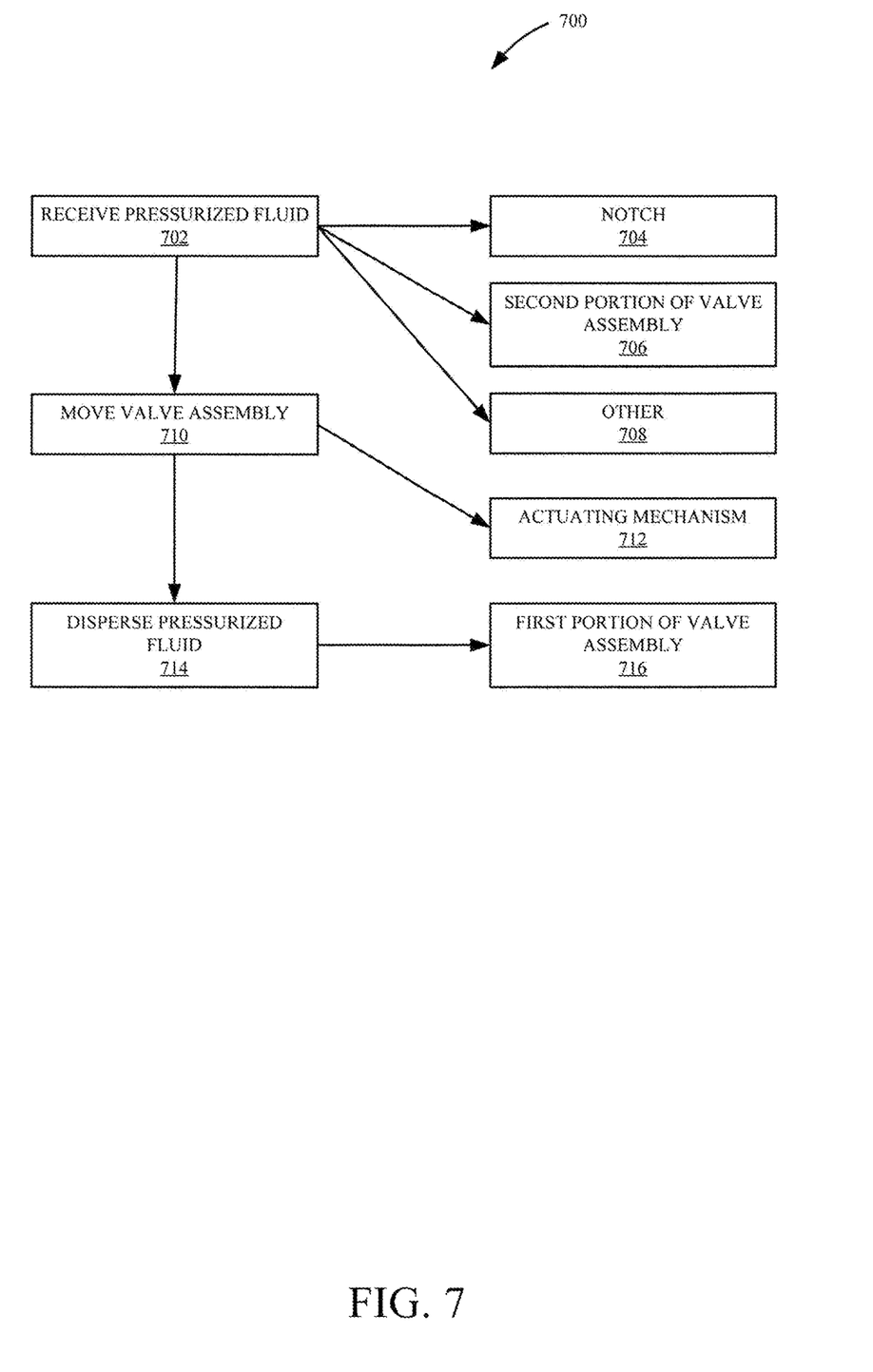
FIG. 7 is a flow diagram illustrating an operation of dispersing liquid in accordance with an embodiment of the present invention.

FIG. 7 is a flow diagram illustrating an operation of dispersing liquid in accordance with an embodiment of the present invention.

Method 700 begins at block 702 where a source of pressurized fluid is received. In one embodiment, pressurized fluid is received within a notch of a fluid applicator body, as indicated in block 704. In one example, pressurized fluid is received by an end portion of a valve assembly as indicated in block 706. However, other components of a spray gun can receive pressurized fluid as indicated in block 708.

Next, at block 710, a valve assembly of the fluid applicator is moved from a first to a second position. In one example, the valve assembly is moved using an actuating mechanism, as indicated in block 712. Upon moving the valve assembly from the first to the second position, pressurized fluid is then dispersed as indicated in block 714. In one example, as the pressurized fluid is dispersed, the fluid comes into fluidic contact with a front end portion of the valve assembly, as indicated in block 716.

Although the present invention has been described with reference to preferred embodiments, workers skilled in the art will recognize that changes may be made in form and detail without departing from the spirit and scope of the invention.

What is claimed is:

1. A paint spray gun comprising:
   an inlet configured to receive a pressurized liquid;
   an outlet configured to disperse the pressurized liquid;
   a body defining a fluid path from the inlet to the outlet;
   a valve assembly configured to be movable between a first position and a second position, the valve assembly comprising:
   a first end portion having a portion of a blocking member configured to contact a seat within the body when the valve assembly is in the first position and the first end portion is configured to be in fluidic contact with the pressurized liquid at the second position; and a second end portion opposite the first end portion, wherein the second end portion is configured to be in fluidic contact with the pressurized liquid at the first position, and the second position, the second end portion comprises a distal portion of a guide having a plurality of grooves configured to receive the pressurized liquid while the valve assembly is at the second position; and wherein the first end portion exerts a first force on the valve assembly in a first direction when in fluidic contact with the pressurized liquid and the second end portion exerts a second force on the valve assembly in a second direction when in fluidic contact with the pressurized liquid, wherein the first force and second force apply an equal pressure on all sides of the valve assembly such that the first force and the second force are equal and oppose one another when exerted on the valve assembly;

an actuating mechanism; disposed upstream in the fluid path relative to the seat, configured to couple to the valve assembly and selectively move the valve assembly within the body between the first position and the second position.

2. The spray gun of claim 1, wherein a coupling between the actuating mechanism and the valve assembly comprises a radial groove proximate the second end portion of the valve assembly contacting a protrusion of the actuating mechanism.

3. The spray gun of claim 1, wherein the body comprises a notch configured to receive the pressurized liquid upon receiving the pressurized liquid through the inlet.

4. The spray gun of claim 1, wherein the actuating mechanism selectively moves the valve assembly based on a user applied pressure to a trigger coupled to the body.

5. The spray gun of claim 4, wherein the user applied pressure to the trigger generates a rotational force configured to be converted into a linear force by the actuating mechanism and used to selectively move the valve assembly between the first position and the second position.

6. The spray gun of claim 5, wherein the actuating mechanism is a cam configured to convert the rotational force into the linear force.

7. The spray gun of claim 4, wherein the fluid applicator further comprises:
a coupling mechanism configured to simultaneously couple the actuating mechanism to the trigger.

8. The spray gun of claim 1, wherein the first force and the second force equally counter one another when the equal pressure is applied on all sides of the valve assembly.

9. The spray gun of claim 1, wherein the spray gun further comprises:
a handle configured to couple to the body and be held during a liquid spraying application, the handle comprising a top housing and a bottom housing.

10. The spray gun of claim 1, further comprising:
a sealing mechanism configured to prevent the pressurized liquid from leaking from the body during operation of the spray gun; and,
wherein the actuating mechanism comprises a radially extending portion configured to contact the valve assembly and a longitudinal portion configured to contact the sealing mechanism.

11. An airless paint spray gun comprising:
a body defining, a fluid path from an inlet to an outlet, wherein the inlet receives a pressurized liquid and the outlet disperses the pressurized liquid through the outlet;

a valve assembly disposed entirely within the fluid path comprising:
a first end portion and second end portion that are in fluidic contact with the pressurized liquid and the fluidic contact on the first end portion and the second end portion enacts an equal force on the valve assembly, wherein the equal force enacted by the first end portion and the second end portion are equal and oppose one another;
a blocking member configured to contact a seat within the body; and
a radial groove;
a trigger configured to be selectively movable between an actuated position and a non-actuated position; and
a coupling mechanism configured to couple the trigger to an actuating mechanism disposed upstream in the fluid path relative to the seat, the actuating mechanism configured to fit within the radial groove of the valve assembly and selectively move the valve assembly between an opened and a closed position.

12. The spray gun of claim 11, wherein, upon moving, the trigger to the actuated position, the actuating mechanism is configured to simultaneously move the valve assembly to the opened position.

13. The spray gun of claim 12, wherein the fluid path comprises:
an inlet portion comprising the inlet;
a valve portion wherein the valve assembly is disposed; and
wherein the inlet portion extends along an inlet axis and the valve portion extends along a valve axis.

14. The spray gun of claim 12, wherein the fluid applicator comprises:
a sealing mechanism configured to, prevent the pressurized liquid from leaking from the body during operation of the spray gun.

15. The spray gun of claim 11, wherein, upon receiving the pressurized liquid through the inlet, the pressurized liquid is configured to contact a notch within the body.

16. The spray gun of claim 11, further comprising a handle disposed rearward of the inlet, such that the inlet is disposed between the outlet and the handle.

17. A paint spray gun comprising:
a body defining a fluid path, the body configured to receive a pressurized liquid through an inlet and disperse the pressurized liquid through an outlet;
a trigger configured to be selectively moveable between an actuated and a non-actuated position based on a received pressure from a user;
a valve assembly configured to be movable between an open position and a closed position comprising:
a first end portion and second end portion that, when in the open position, are in fluidic contact with the pressurized liquid and the fluidic contact on the first end portion and the second end portion enacts an equal force on the valve assembly, wherein the equal force enacted by the first end portion and the second end portion are equal and oppose one another; and
a radial groove configured to receive the pressurized liquid when the valve assembly is at the first position or the second position; and
a plurality of longitudinal grooves configured to receive the pressurized liquid when the valve assembly is at the second position;
an actuating mechanism, disposed upstream in the fluid path relative to a seat within the body, configured to move the valve assembly between the first position and the second position based on the received pressure from the user; and a coupling mechanism configured to couple the trigger to the actuating mechanism.

18. The spray gun of claim 17, wherein the valve assembly comprises a blocking member, a guide and a biasing member.

19. The spray gun of claim 17, wherein the actuating mechanism comprises a longitudinal, portion that is at least partially in fluidic contact with the pressurized fluid and a radially extending portion that couples to the radial groove.

* * * * *